United States Patent
Noll et al.

(10) Patent No.: US 7,374,229 B1
(45) Date of Patent: May 20, 2008

(54) ADJUSTABLE CAB EXTENDER

(75) Inventors: Michael L. Noll, Fort Wayne, IN (US); Dustin J. Sadler, Auburn, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/673,155

(22) Filed: Feb. 9, 2007

(51) Int. Cl.
*B62D 35/00* (2006.01)

(52) U.S. Cl. ............................... 296/180.2; 296/180.3

(58) Field of Classification Search ............ 296/180.1, 296/180.2, 180.3, 180.4, 180.5; 180/903
See application file for complete search history.

(56) References Cited

U.S. PATENT DOCUMENTS

| | | | |
|---|---|---|---|
| 3,711,146 A * | 1/1973 | Madzsar et al. ......... | 296/180.2 |
| 4,119,339 A * | 10/1978 | Heimburger ............. | 296/180.5 |
| 4,518,188 A * | 5/1985 | Witten ..................... | 296/180.2 |
| 4,611,847 A | 9/1986 | Sullivan | |
| 4,746,160 A | 5/1988 | Wiesemeyer | |
| 4,904,015 A | 2/1990 | Haines | |
| 5,078,448 A | 1/1992 | Selzer et al. | |
| 6,428,084 B1 * | 8/2002 | Liss ........................ | 296/180.3 |
| 6,846,035 B2 | 1/2005 | Wong et al. | |
| 6,886,882 B2 | 5/2005 | Farlow et al. | |
| 6,932,419 B1 | 8/2005 | McCullough | |
| 2007/0182207 A1 * | 8/2007 | Nakaya ................... | 296/180.1 |
| 2007/0200390 A1 * | 8/2007 | Lotarev et al. .......... | 296/180.2 |
| 2007/0257513 A1 * | 11/2007 | Schwartz ................. | 296/180.3 |

* cited by examiner

Primary Examiner—Jason S Morrow
(74) Attorney, Agent, or Firm—Jeffrey P. Calfa; Gerald W. Askew

(57) ABSTRACT

A cab extender assembly for selectively changing the aerodynamic drag on a vehicle having a longitudinal axis includes a fixed cab extender and at least one track extending generally parallel to the longitudinal axis of the vehicle. An adjustable cab extender has at least one moveable member that is engaged in the track. An actuator assembly is configured for selectively reciprocating the adjustable cab extender along the track and with respect to the fixed cab extender.

14 Claims, 3 Drawing Sheets

ADJUSTABLE CAB EXTENDER

BACKGROUND OF THE INVENTION

The present invention relates generally to automotive cab extenders. More specifically, the present invention relates to an adjustable automotive cab extender.

The drag on a tractor trailer truck significantly reduces the fuel efficiency of the vehicle. One area where significant drag is created is at a gap located between the tractor and the trailer. This gap is typically 36 to 48 inches, depending on the vehicle and depending on the amount of loading on the trailer. The larger the gap, the more air that is trapped in the gap, and the more drag that is created on the vehicle.

Fixed cab extenders are commonly used to reduce the gap distance, and in turn, reduce the drag. The fixed cab extender is typically a rigid, planar panel that extends lengthwise with respect to the vehicle along at least a portion of the gap distance between the tractor and the trailer. However, the fixed cab extender does not extend the entire gap distance because allowances between the extender and the trailer must be made to accommodate for the tractor turning relative to the trailer. For this reason, a clearance is provided between the fixed cab extender and the trailer. However, the remaining clearance still creates a substantial amount of drag on the vehicle.

Thus, there is a need for an adjustable length cab extender.

There is also a need for an adjustable length cab extender that can be retrofitted onto an existing, fixed cab extender.

BRIEF SUMMARY OF THE INVENTION

The above-listed needs are met or exceeded by the present cab extender assembly for selectively changing the aerodynamic drag on a vehicle having a longitudinal axis. The assembly includes a fixed cab extender and at least one track extending generally parallel to the longitudinal axis of the vehicle. An adjustable cab extender has at least one moveable member that is engaged in the track. An actuator assembly is configured for selectively reciprocating the adjustable cab extender along the track and with respect to the fixed cab extender.

An adjustable cab extender kit for retrofitting an existing, fixed cab extender for selectively changing the aerodynamic drag on a vehicle having a longitudinal axis is also provided. The kit includes at least one track configured to extend generally parallel to the longitudinal axis of the vehicle, and a generally planar body. At least one moveable member is configured to be coupled to the generally planar body and received in the track. An actuator assembly is configured for selectively reciprocating the adjustable cab extender along the track and with respect to the fixed cab extender.

Also provided is an adjustable extender for selectively changing the aerodynamic drag caused by an opening on a vehicle having a longitudinal axis. The adjustable extender includes at least one track attached to the vehicle and extending towards the opening, and a generally planar member having at least one moveable member engaged in the track. An actuator assembly is configured for selectively reciprocating the generally planar member along the track to cover and expose the opening.

A method for retrofitting a vehicle having an existing, fixed cab extender for selectively changing the aerodynamic drag on the vehicle having a longitudinal axis includes the steps of mounting at least one track to extend generally parallel to the longitudinal axis of the vehicle and providing an adjustable cab extender. The method further includes coupling at least one moveable member to the adjustable cab extender and to the track. The moveable member is received by the track. An actuator assembly is provided and configured for selectively reciprocating the adjustable cab extender along the track and with respect to the fixed cab extender.

DETAILED DESCRIPTION OF THE INVENTION

Figure 1:
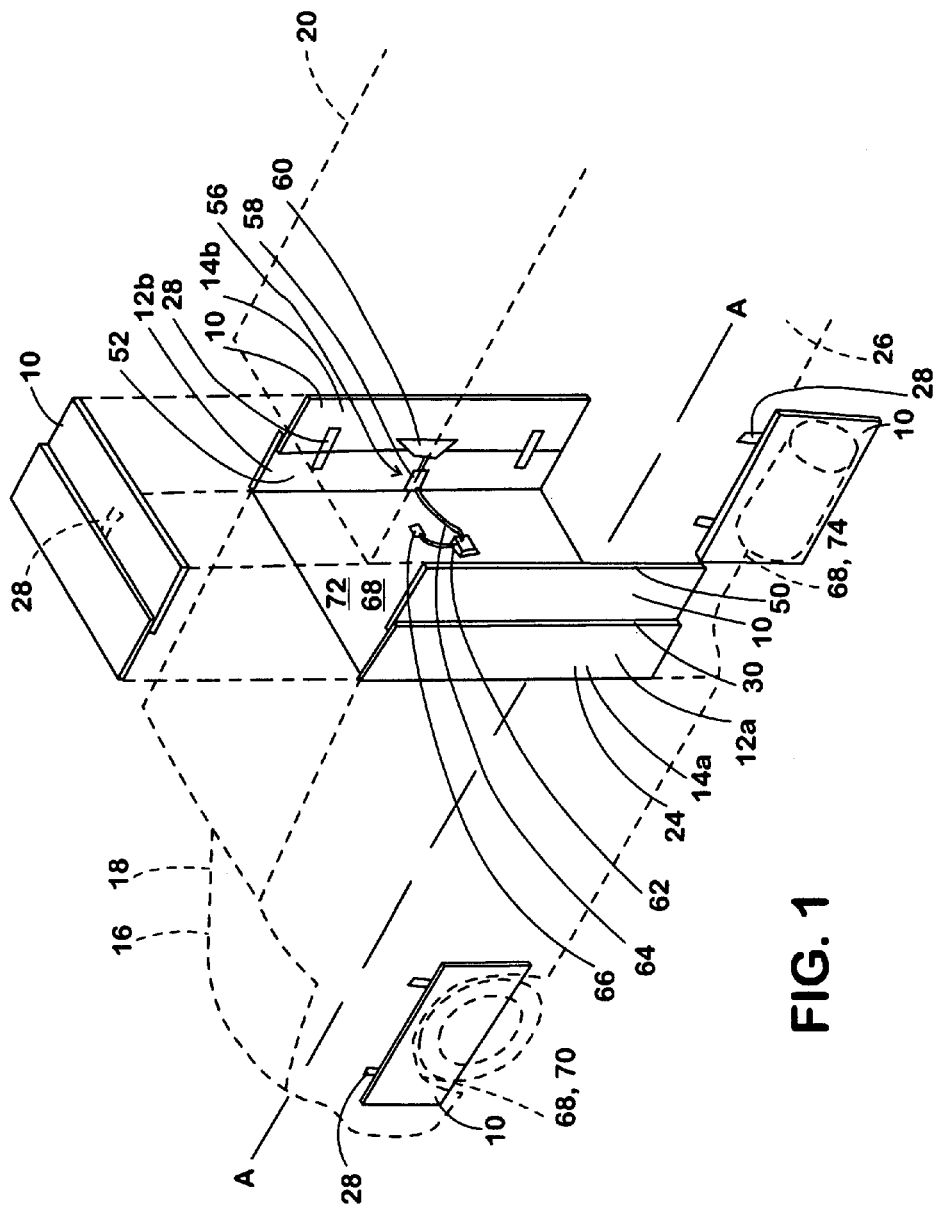
FIG. 1 is a perspective view of an adjustable cab extender of the present invention and attached to a vehicle having a trailer and a fixed cab extender attached to a tractor.
Figure 2:
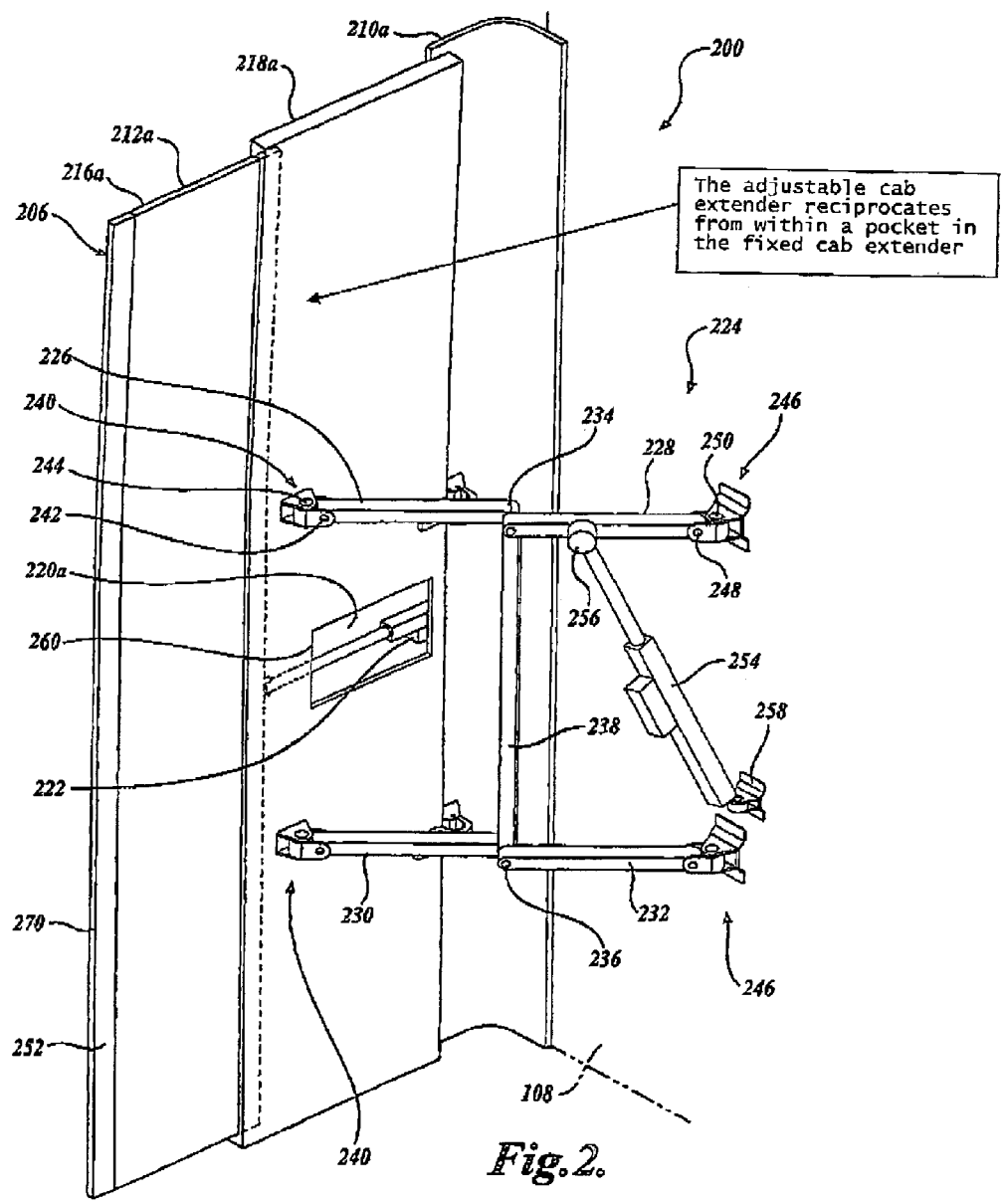
FIG. 2 is a side view of the adjustable cab extender and the fixed cab extender.

Referring to FIGS. 1-2, an adjustable cab extender of the present invention is depicted generally at 10, and is attached to a fixed cab extender 12. Together, the adjustable cab extender 10 and the fixed cab extender 12 form an extender assembly 14, where two extender assemblies 14a, 14b are implemented on a vehicle 16 preferably having a tractor 18 coupled to a trailer 20. While the present adjustable cab extender assembly 14 is described with respect to a tractor 18 and trailer 20 type vehicle, it is contemplated that the assembly 14 can be used on other vehicles.

As is known in the art, each fixed cab extender 12a, 12b is attached to the back surface of the vehicle 16 and is substantially parallel to a longitudinal axis "A" of the vehicle to enclose a portion of the gap. The fixed cab extender 12 is preferably formed of rigid material, such as steel or aluminum, however other materials are contemplated.

The fixed cab extender 12 has a length that spans a portion of the gap between a front surface 22 of the trailer 20 and the tractor 18, but preferably does not extend the entire gap. To minimize drag, each fixed cab extender 12 is oriented to direct the airflow from the tractor 18 along an outer surface 24 of the extender and back towards a side surface 26 of the trailer 20.

The fixed cab extender 12 forms a clearance between the fixed cab extender and the trailer 20. The clearance permits the tractor 18 to pivot with respect to the trailer 20 without having the trailer contact the fixed cab extender 12.

The adjustable cab extender 10 is reciprocably and slidably attached to the fixed cab extender 12 on at least one track 28, as will be described with more detail below. The adjustable cab extender 10 preferably has similar dimensions to the fixed cab extender 12, and more preferably has a sufficient length to extend towards and contact the trailer 20. Specifically, the adjustable cab extender 10 is sized and shaped to extend at least from the trailing surface 30 of the fixed cab extender 12 substantially along the clearance, and preferably at least to the front surface 22 of the trailer 20 to enclose the gap. It is contemplated that the height of the adjustable extender 10 is generally the same as the height of the fixed cab extender 12, however other heights are contemplated. Preferably, the cab extender assembly 14 has a height equal to the height of the trailer 20 and/or the tractor 18. Further, the adjustable cab extender 10 is preferably a generally thin, planar body made of a flexible material, such as rubber, however rigid materials may also be used.

Figure 3:
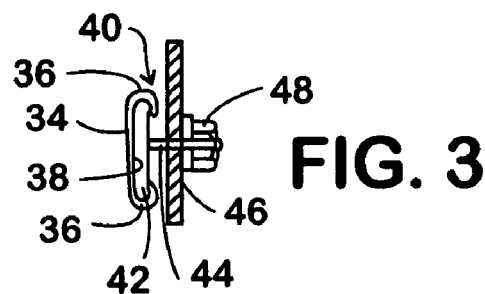
FIG. 3 is a cross-sectional view of a cab extender on a track and taken along line A-A of FIG. 2.

Referring now to FIGS. 2-3, the track 28 couples the adjustable cab extender 10 to the fixed cab extender 12, and extends substantially parallel to a longitudinal axis "A" of the vehicle 16. In the preferred embodiment, there are multiple tracks 28 associated with each adjustable cab extender 10.

The track 28 preferably includes a main member 34 and two side members 36 extending generally perpendicularly from the main member at an upper and a lower end of the main member. The main member 34 and the side members 36 can be integrally formed or formed of discrete parts. Together, the main member 34 and the two side members 36 preferably form a channel 38 for receiving at least one moveable member 40, which is attached to the adjustable cab extender 10.

The moveable member 40 preferably includes at least one wheel 42. In the preferred embodiment, multiple wheels 42 are disposed along the length of the adjustable cab extender 10 and are received in the track 28. An axle 44 preferably extends from each wheel 42 generally perpendicularly from the direction of movement of the wheel, through an aperture 46 in the adjustable cab extender 10, and to a receiving member 48 located on the other side of the adjustable cab extender. In this configuration, the adjustable cab extender 10 is configured to slide along the track 28. Preferably, when the adjustable cab extender 10 is deployed, the two extenders 10, 12 are substantially parallel to each other and fully enclose the gap.

Figure 4:
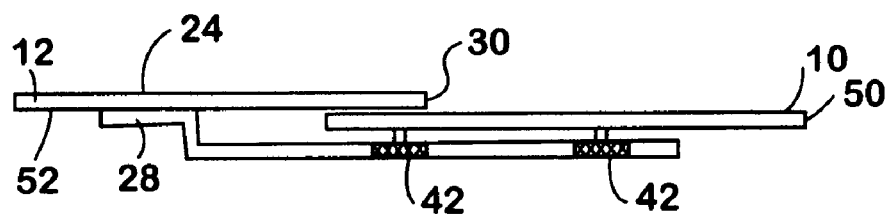
FIG. 4 is a top plan view of the extender assembly on the track.
Figure 5:
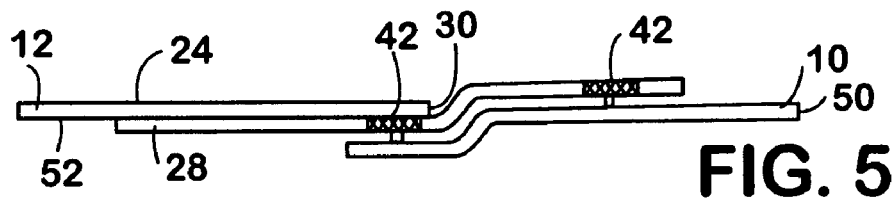
FIG. 5 is a top plan view of the extender assembly attached on an alternate embodiment of a track.
Figure 6:
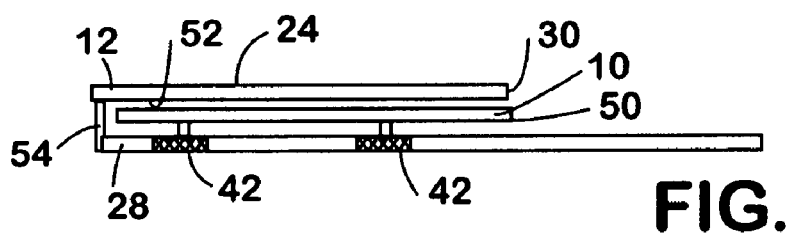
FIG. 6 is a top plan view of the extender assembly attached on another embodiment of a track.

As seen in FIGS. 4-6, the track 28 can have many different shapes in accordance with the desired displacement of the adjustable cab extender 10 in both the axial direction or angularly therefrom. The position of a trailing edge 50 of the adjustable extender 10 relative to the trailer 20 can be selectively varied by varying the shape and alignment of the track 28.

While the preferred track 28 is positioned on an inside surface 52 of the fixed cab extender 12, the track can also extend from the outside surface 24 of the fixed cab extender. Additionally, the track 28 can be formed in discrete sections, can be linear, or can have bends. In the track 28 embodiment with bends, the adjustable cab extender 10 should be sufficiently flexible to traverse the bends on the track. Further, the track 28 can be mounted a distance from the inside surface 52 of the fixed cab extender 12, such as with a bracket 54 or other mechanical attachment.

In the preferred embodiment, the adjustable cab extender 10 is reciprocated to the inside surface 52 of the fixed cab extender 12. However, it is contemplated that the adjustable cab extender 20 can be reciprocated to the outer surface 24 of the fixed cab extender 12.

The cab extender assembly 14 permits the selective reciprocal motion of the adjustable cab extender 10 to a fixed cab extender 12, which changes the aerodynamic drag of the vehicle 16. The adjustable cab extender 10 can be positioned in a stowed position (towards the tractor), an extended position (towards the trailer), and at any position therebetween. Preferably, the fully stowed position of the adjustable cab extender 10 is such that the trailing edge 50 of the adjustable extender is aligned with or retracted from the trailing edge 30 of the fixed cab extender 12, however it is contemplated that the fully stowed position may protrude from the trailing edge of the fixed cab extender. Further, it is preferred that the fully extended position encloses the gap, however it is contemplated that a small clearance can still be located between the adjustable cab extender 10 and the trailer 20.

The adjustable cab extender 10 is selectively positionable in response to speed of the vehicle 16. Specifically, the adjustable cab extenders 10 are positioned in the stowed position (such that a trailing end 50 of the adjustable cab extender 10 does not impact the trailer 20) during low speeds of travel. During high speed (when the vehicle 16 is less likely to/and or is restricted from making hard turns due to speed), the adjustable cab extender 10 is moved to the extended position. It is contemplated that adjustable extenders 10 can be moved into any position in between a fully stowed position and a fully deployed position, for example during braking of the vehicle 16.

An actuating assembly 56 moves the adjustable cab extender 10 with respect to the fixed cab extender 12. The actuating assembly 56 includes an extender actuator 58, such as a hydraulic, pneumatic or magnetic actuator, that is coupled to the adjustable cab extender 10. Links 60 or other mechanical members are coupled to the extender actuator 58 and the adjustable cab extender 10. When the extender actuator 58 is actuated, the extender actuator pushes on the link 60, which in turn, pushes on the adjustable cab extender 10 and causes it to displace along the track 28.

Referring back to FIG. 1, a control device 62 controls the actuating assembly 56 and is preferably coupled to the extender actuator 58 with wiring 64. When a sensor 66 senses a vehicle speed above a predetermined amount, the control device 62 commands the extender actuator 58 to deploy the adjustable cab extender 10 towards the trailer 20. When the sensor 66 senses a predetermined low speed of the vehicle 16, the control device 62 commands the extender actuator 58 to retract the adjustable cab extenders 10 to the stowed position so that the trailing edge 50 of the extender does not impact the trailer 20 during a turn.

An advantage of the cab extender assembly 14 is that the adjustable cab extender 10 and the accompanying actuating assembly 56 can be retrofitted onto an existing, conventional fixed cab extender 12. In some prior art cab extender assemblies, the existing, conventional fixed cab extender needs to be replaced with another fixed cab extender that includes an interior pocket for receiving the adjustable cab extender. However, since the present adjustable cab extender 10 slides along side the fixed cab extender 12, the existing, conventional fixed cab extender can be used. Further, the relatively simple construction of the track 28 and of the extender actuator 58 make retrofitting the existing cab extender assembly 14 relatively easy compared to some prior art cab extender assemblies.

Additionally, the adjustable cab extender 10 can be applied to other openings 68 causing areas of drag on the vehicle, such as over wheel wells 70, over the top of the cab 72, and over the gas tank 74. In these applications, it is contemplated that adjustable extenders 10 can be deployed and retracted along tracks 28 (as described above) that are attached to the vehicle 16. The tracks 28 preferably extend towards or over the openings 68. The adjustable extenders 10 selectively cover the openings 68 to reduce drag on the vehicle 16 in accordance with the vehicle speed (as described above).

While particular embodiments of the present extender assemblies 14 have been shown and described, it will be appreciated by those skilled in the art that changes and modifications may be made thereto without departing from the invention in its broader aspects and as set forth in the following claims.

We claim:

1. A cab extender assembly for selectively changing the aerodynamic drag on a vehicle having a longitudinal axis, comprising:
   a fixed cab extender having a first side surface forming an exterior surface of the vehicle and a second side surface opposite said first side surface;
   at least one track disposed on said second side surface and extending generally parallel to the longitudinal axis;
   an adjustable cab extender disposed on said second side surface of said fixed cab extender and having at least one moveable member engaged in said track;
   an actuator assembly configured for selectively reciprocating said adjustable cab extender along said track and along said second side surface of said fixed cab extender.

2. The cab extender assembly of claim 1 wherein said adjustable cab extender is moveable between a stowed position and a deployed position.

3. The cab extender assembly of claim 2 wherein said adjustable cab extender is positionable generally parallel to and adjacent an inside surface of said fixed cab extender in the stowed position.

4. The cab extender assembly of claim 1 wherein said actuator assembly deploys said adjustable cab extender above a predetermined speed.

5. The cab extender assembly of claim 1 wherein said at least one track includes a main member and two side members forming a channel.

6. The cab extender of claim 5 wherein said at least one track is integrally formed.

7. The cab extender assembly of claim 1 wherein said at least one moveable members further comprise at least one wheel.

8. The cab extender assembly of claim 1 wherein said adjustable cab extender is formed of a flexible material.

9. The cab extender assembly of claim 1 wherein said actuator assembly comprises a extender actuator and at least one linkage coupled between said extender actuator and said adjustable cab extender.

10. An adjustable cab extender kit for retrofitting an existing, fixed cab extender having a first side surface forming an exterior surface of a vehicle and a second side surface opposite said first side surface, the kit configured for selectively changing the aerodynamic drag on the vehicle having a longitudinal axis, comprising:
    at least one track configured to be disposed on the second side surface of the fixed cab extender and extending generally parallel to the longitudinal axis of the vehicle;
    an adjustable cab extender;
    at least one moveable member configured to be coupled to said adjustable cab extender and configured to be received in said track;
    an actuator assembly configured for selectively reciprocating said adjustable cab extender along said track and along said second side surface of said fixed cab extender.

11. The adjustable cab extender kit of claim 10 wherein said adjustable cab extender is flexible.

12. The adjustable cab extender kit of claim 10 wherein said at least one track is configured to be mountable on the fixed cab extender.

13. The adjustable cab extender kit of claim 10 wherein said actuator assembly deploys said adjustable cab extender above a predetermined speed.

14. A method for retrofitting a vehicle having an existing, fixed cab extender having a first side surface forming an exterior surface of a vehicle and a second side surface opposite said first side surface, the method for selectively changing the aerodynamic drag on the vehicle having a longitudinal axis, comprising:
    mounting at least one track on the second side surface of the fixed cab extender and extending generally parallel to the longitudinal axis of the vehicle;
    providing an adjustable cab extender;
    coupling at least one moveable member to said adjustable cab extender and to said at least one track, wherein said moveable member is received by said track;
    providing an actuator assembly configured for selectively reciprocating said adjustable cab extender along said track and along said second side surface of said fixed cab extender.

* * * * *